United States Patent
Kotz et al.

[11] Patent Number: 5,995,690
[45] Date of Patent: Nov. 30, 1999

[54] FRONT LIGHT EXTRACTION FILM FOR LIGHT GUIDING SYSTEMS AND METHOD OF MANUFACTURE

[75] Inventors: Arthur L. Kotz; Mary B. Poppendieck, both of St. Paul, Minn.; Michiru Hata, Kanagawa, Japan

[73] Assignee: Minnesota Mining and Manufacturing Company, St. Paul, Minn.

[21] Appl. No.: 08/755,767

[22] Filed: Nov. 21, 1996

[51] Int. Cl.$^6$ .................................................. G02B 6/26
[52] U.S. Cl. .............................. 385/25; 385/43; 385/146; 385/129
[58] Field of Search ................................ 362/32; 385/25, 385/901, 146, 36, 37, 42, 43, 48, 50, 129, 130, 131

[56] References Cited

U.S. PATENT DOCUMENTS

| | | | |
|---|---|---|---|
| 4,052,120 | 10/1977 | Sick et al. | 350/6 |
| 4,975,807 | 12/1990 | Ohashi | 362/23 |
| 5,175,030 | 12/1992 | Lu et al. | 428/30 |
| 5,183,597 | 2/1993 | Lu | 264/1.38 |
| 5,396,350 | 3/1995 | Beeson et al. | 362/31 |
| 5,428,468 | 6/1995 | Zimmerman et al. | 362/31 |
| 5,462,700 | 10/1995 | Beeson et al. | 385/146 |
| 5,506,929 | 4/1996 | Tai et al. | 385/146 |
| 5,521,725 | 5/1996 | Beeson et al. | 362/31 |
| 5,555,329 | 9/1996 | Kuper et al. | 385/30 |
| 5,696,865 | 12/1997 | Beeson et al. | 385/901 |

FOREIGN PATENT DOCUMENTS

| | | |
|---|---|---|
| WO 94/20871 | 9/1994 | WIPO. |
| 95/11464 | 4/1995 | WIPO. |
| WO 97/08490 | 3/1997 | WIPO. |
| WO 97/27423 | 7/1997 | WIPO. |

*Primary Examiner*—Hung N. Ngo
*Attorney, Agent, or Firm*—Merchant, Gould, Smith, Edell, Welter & Schmidt, P.A.

[57] ABSTRACT

The present invention is directed to a front light extraction tape for coupling light out of a light guiding device. The tape has a flexible, light transmissive outer portion and a light coupling element secured to a lower surface of the outer portion without using adhesive. An input surface of the light coupling element is contactable with an output surface of the light guiding device for receiving light therefrom. A reflecting surface of the light coupling element is aligned so as to reflect light received into the light coupling element through the light transmissive outer portion. The light coupling element may be formed integrally with the outer portion so as to avoid a material interface between the light coupling element and the outer portion.

30 Claims, 9 Drawing Sheets

FIG. 4D
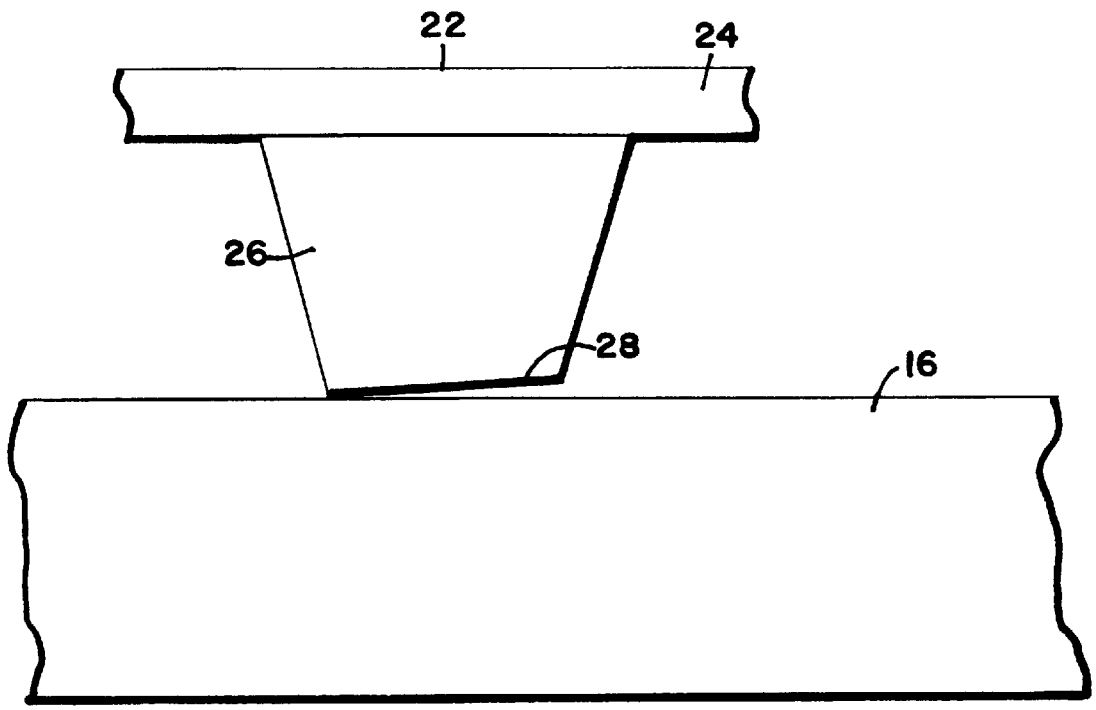
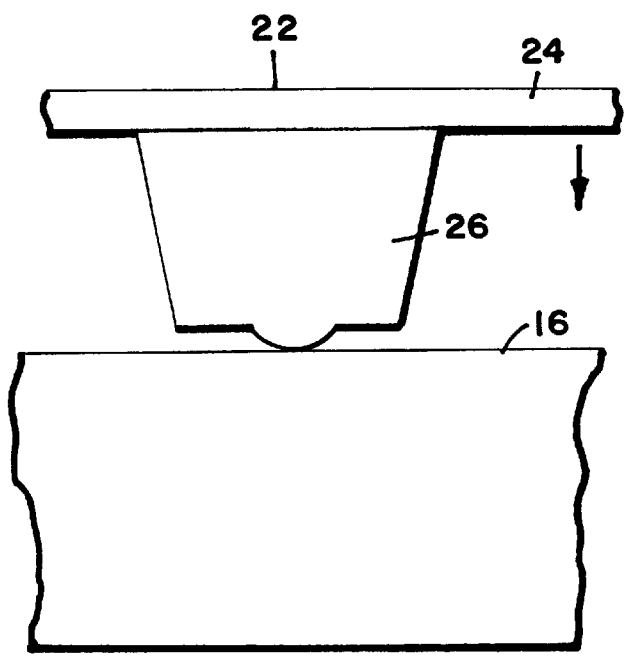
FIG. 4C

FIG. 6A
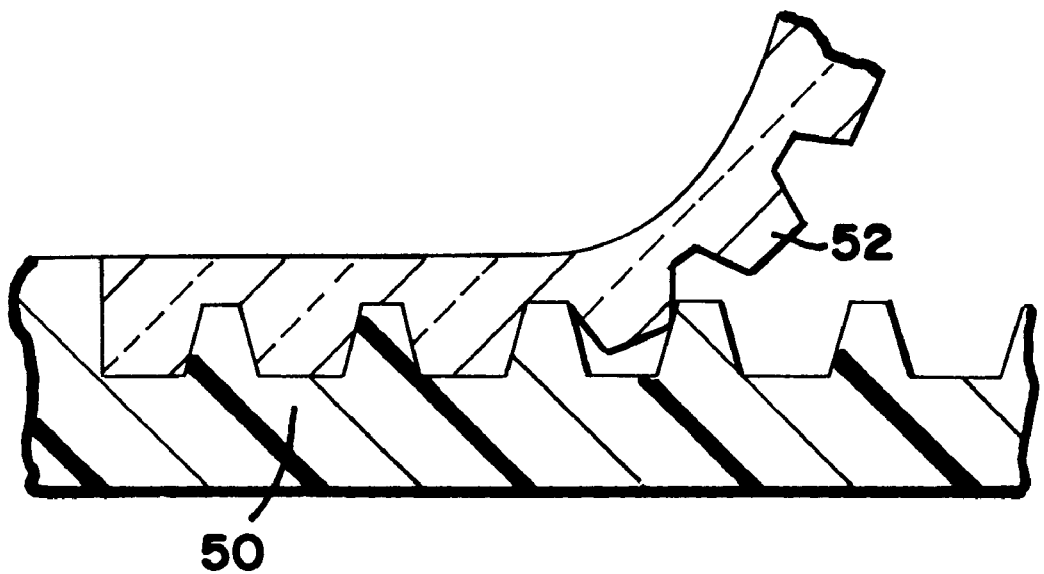
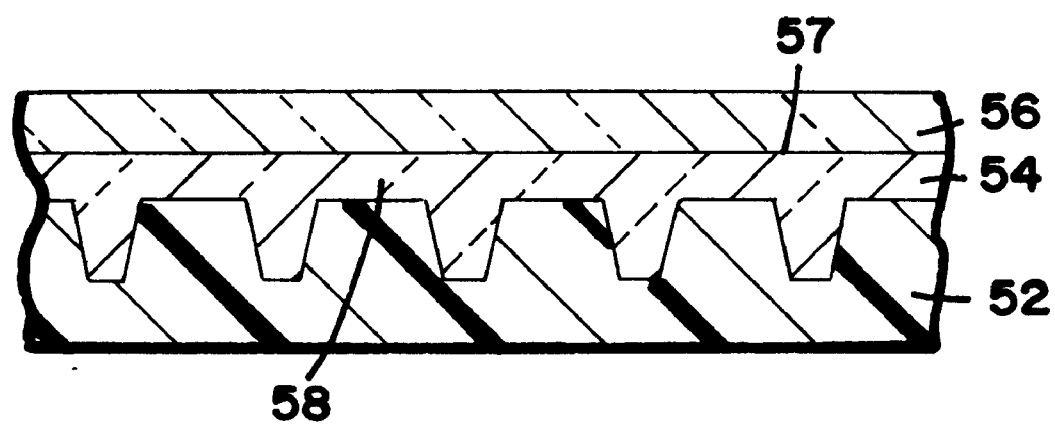
FIG. 6B

FRONT LIGHT EXTRACTION FILM FOR LIGHT GUIDING SYSTEMS AND METHOD OF MANUFACTURE

BACKGROUND OF THE INVENTION

1. Field of the Invention

This invention relates in general to an apparatus for extracting light transversely from a light guiding system, and more particularly, to a front light extraction tape applicable to surfaces of waveguides for extracting light therefrom.

2. Description of Related Art

There has been an extensive effort to develop methods of extracting light transversely from optical waveguides, such as large core plastic optical fibers and slab waveguides. Optical waveguides having transverse light outputs may be used as extended light sources, such as may be used for backlighting an active liquid crystal display panel. The flexibility afforded by large core plastic fiber further permits the production of extended light sources having arbitrary shape.

There have been several attempts at coupling light out of the side of an optical waveguide. One method of coupling light transversely from a waveguide employs a number of prisms attached to the waveguide. The prisms have a refractive index the same as or higher than the refractive index of the waveguide. Thus, light which would normally be totally internally reflected by the waveguide is transmitted through the interface between the waveguide and the prisms, and directed away from the waveguide in essentially a transverse direction.

Several approaches have been followed in fabricating a transverse light extractor of this type. One known approach, disclosed in U.S. Pat. No. 5,396,350, includes securing prisms to a waveguide surface using an adhesive layer, and further securing the output surfaces of the prisms to a backing layer by a second layer of adhesive. Such a light extractor has a complex structure, having many layers and resulting in high reflective losses. The transverse light extractor is fabricated using photolithographic techniques, which are not well suited to fabricating nonplanar devices. This limits the shape of the light extractor, and restricts the applications where it can be used.

Another light extractor, disclosed in U.S. Pat. No. 5,521,725, comprises a spacer with prisms molded on a lower surface of the spacer and with lenses molded on an upper surface of the spacer. The light extractor uses a layer between the prisms and the waveguide to which it is attached for extracting light from the waveguide. Additionally, the prisms, spacer, and lenses are formed from the same material since the extractor is molded.

There is, therefore, a need for a transverse light extractor having a simpler structure than that of currently available transverse light extractors, in which there are fewer layers and the reflective losses are reduced. There is also a need for a transverse light extractor which is not limited to planar geometries, but which can be adapted to nonplanar geometries.

Additionally, there is a need for a light extractor which may be used without an extra layer between the extractor and the waveguide. Furthermore, there is a need for a light extractor which is simple in structure and which permits the prisms and the spacer to be formed form different materials.

SUMMARY OF THE INVENTION

The present invention is directed to a front light extraction tape for coupling light out of a light guiding device. The tape has a light transmissive outer portion and a light coupling element secured to a lower surface of the outer portion without using adhesive. An input surface of the light coupling element is contactable with an output surface of the light guiding device for receiving light therefrom. A reflecting surface of the light coupling element is aligned so as to reflect light received into the light coupling element through the light transmissive outer portion. The light coupling element may be formed integrally with the outer portion so as to avoid any material interface between the light coupling element and the outer portion.

The present invention is also directed to an optical waveguiding device employing the front extraction tape and to methods of manufacturing the front extraction tape.

BRIEF DESCRIPTION OF THE DRAWINGS

The invention may be more completely understood and consideration of the detailed description of various embodiments of the invention which follows in connection with the accompanying drawings, in which:

FIG. 4C illustrates a light coupling element having a spherical portion on a flat input face;

FIG. 4D illustrates a light coupling element having a flat input face at an angle to a waveguiding core;

FIG. 6A illustrates the formation of a negative mold for a light extraction tape;

FIG. 6B illustrates the formation of a light extraction tape from the negative mold of FIG. 6A;

Figure 1:
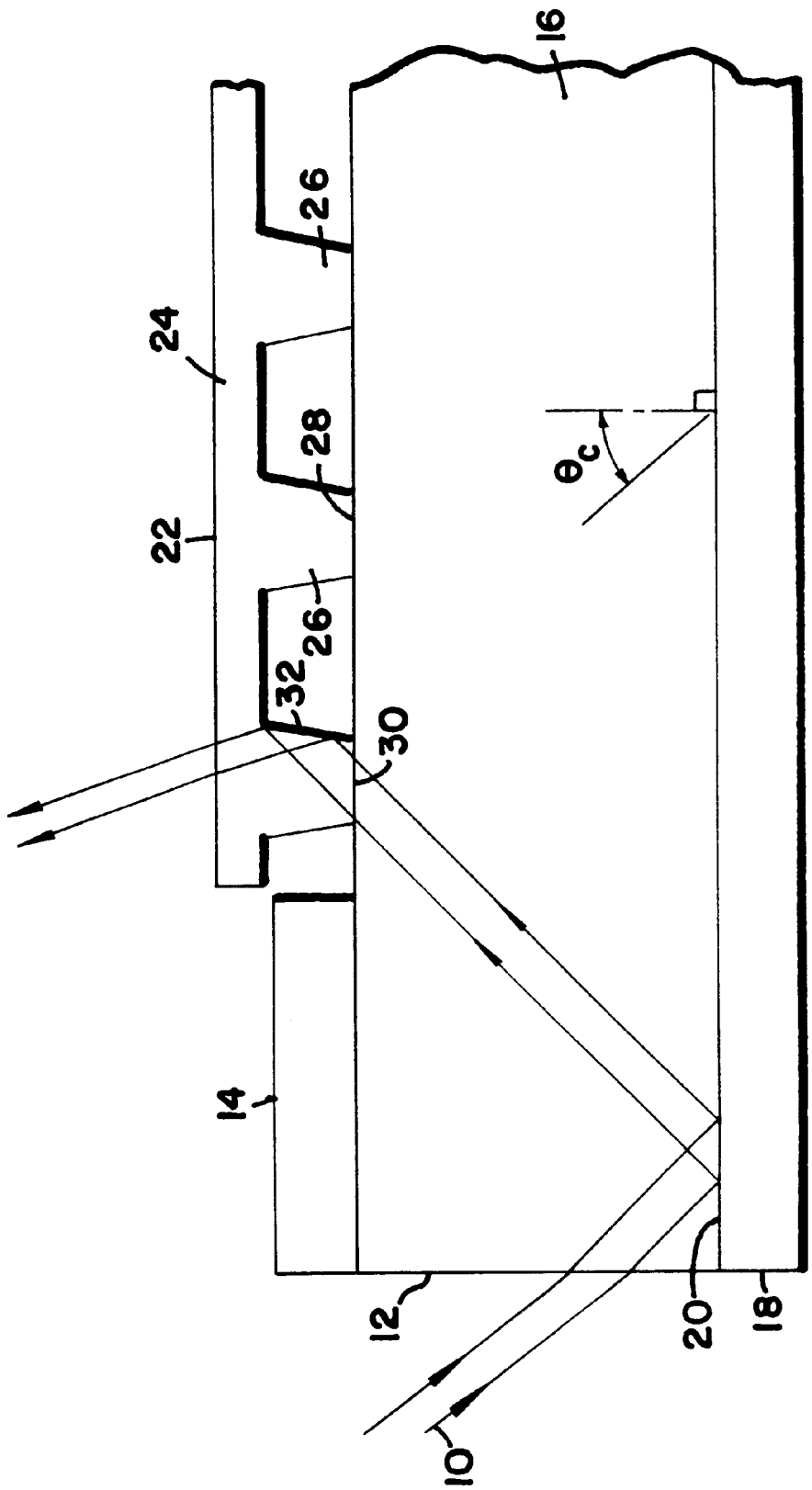
FIG. 1 is a cross-sectional view of a waveguide where light is extracted transversely therefrom using a first embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE ILLUSTRATED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention is applicable to a variety of systems and arrangements in which it is desired to extract light from a light guiding system, such as a waveguide. Light guiding systems are assumed to include small core and large core diameter optical fibers, planar optically guiding substrates, and other devices employing total internal reflection for guiding light from one point to another. The invention has been found to be particularly advantageous in applications where it is desired to extract light transversely from the side of a large core plastic optical fiber, rather than extracting light from a longitudinal end. While the present invention is not so limited, an understanding of various aspects of the invention is best gained through a discussion of various application examples operating in such an environment.

FIG. 1 illustrates a first embodiment in which light 10 is incident upon the input face 12 of an optical fiber 14. The optical fiber 14 includes an inner core 16 whose refractive index is higher than that of a surrounding cladding 18. As the light 10 propagates along the optical fiber 14, the light experiences total internal reflection at the interface 20 between the core 16 and the cladding 18.

In accordance with understood principles of refraction, the critical angle, $\theta_c$, is defined as: $\theta_c = sin^{-1} (n_{clad}/n_{core})$ where $n_{clad}$ and $n_{core}$ are the refractive indices of the cladding 18 and core 16 respectively, and $\theta_c$ is measured from the normal to the interfaces. Light rays having an angle within the core 16 smaller than $\theta_c$ escape from the core 16.

A front extraction tape (FET) 22 is shown on the top surface of the optical fiber 14, at a region from which the cladding 18 has been removed. The FET 22 includes an outer portion 24 and at least one light coupling element 26. The refractive index of the light coupling element 26 is preferably the same or higher than the refractive index of the core 16 for coupling light out of the fiber 14. Thus, when light 10 is incident on the interface 30 between the core 16 and the input face 28, the light is transmitted out of core 16 and into the light coupling element 26, rather than being confined within the core 16. The light 10 reflects off a reflecting surface 32 of the light coupling element 26, so as to exit through the outer portion 24. The light 10 may reflect by total internal reflection at reflecting surface 32 or may be reflected by a reflecting coating, for example a vapor-deposited metal coating provided on the reflecting surface 32. Although the light coupling element 26 is shown to have a trapezoidal shape having an input face 28 in optical contact with the core 16, it is understood that other shapes may be used for the light coupling element 26. The refractive index of the light coupling element 26 is preferably higher than or equal to the refractive index of the core 16 for extracting light from the core 16.

In this first embodiment of the FET 22, the light coupling elements 26 are integrally formed with the outer portion 24 as a unitary structure. Consequently, there is no material interface between the light coupling element 26 and the outer portion 24. This first embodiment is preferably manufactured in a one-stage molding process.

The material from which the FET 22 is manufactured is advantageously compressible and pliable, so that the input face 28 of each light coupling element 26 may conform so as to produce an optical contact with the core 16 under the application of slight pressure. An advantage of using a compressible material for the FET 22 is that the use of an index matching layer between the input face 28 and the core 16 may be avoided. In contrast, prior art light extractors require the use of an index matching layer between the input face of the coupling prism and the waveguide core.

The light extraction rate, defined as the fraction of light in the core 16 coupled out per unit length and measured in % per cm, may be selected by the designer by varying the spacing between light coupling elements 26 and the size of the input surface 28. In general, the light extraction rate varies with the fraction of the surface area of the core 16 covered by the input faces 28 of the light coupling elements. Thus, the light extraction rate remains constant when the spacing between light coupling elements 26 and the area of each input face 28 are reduced by the same factor.

The light extraction rate may be increased along the length of the optical fiber 14 so as to maintain a uniform light output along its length, even though the intensity of light within the fiber 14 reduces with distance.

It is understood that the designer may select a shape for the light coupling element 26 to produce the desired output direction and angular spread. It is also understood that the light coupling elements are preferably designed to have sufficient depth so that light passing out of the core 16 does not miss the reflecting surface 32, but is reflected by the reflecting surface 32 into the desired direction. The trapezoidal light coupling elements 26 may be provided with curved reflecting surfaces 32 so as to tailor the angular spread of the output light for selected applications.

The FET 22 may employ a light coupling element 26 having a refractive index less than the refractive index of the core, but higher than the refractive index of the cladding. The critical angle associated with such a light coupling element, $\theta_1$, is larger than the critical angle associated with the cladding, $\theta_c$. Thus, such a light coupling element 26 permits extraction of light incident on the interface 30 at an angle between $\theta_c$ and $\theta_1$. Thus, such an FET may extract a portion of the "cone" of light within the core 16. Using a series of light coupling elements 26 having increasing refractive indices results in a diminished angle of light propagating through the core 16. Since the light coupling element 26 in this case extracts only that portion of the light propagating through the core 16 at an angle between $\theta_c$ and $\theta_1$, a more highly collimated output may be obtained from the FET 22 than when the refractive index of the light coupling element 26 is higher than or equal to the refractive index of the core 16.

The FET 22 may be attached to the core 16 by a number of methods, including wrapping a cladding over the FET 22, using a heat-shrink cladding, and bonding the light coupling elements 26 to the core 16. The FET 22 may be flexible, so as to fit around a portion of the circumference of the core 16.

Figure 2:
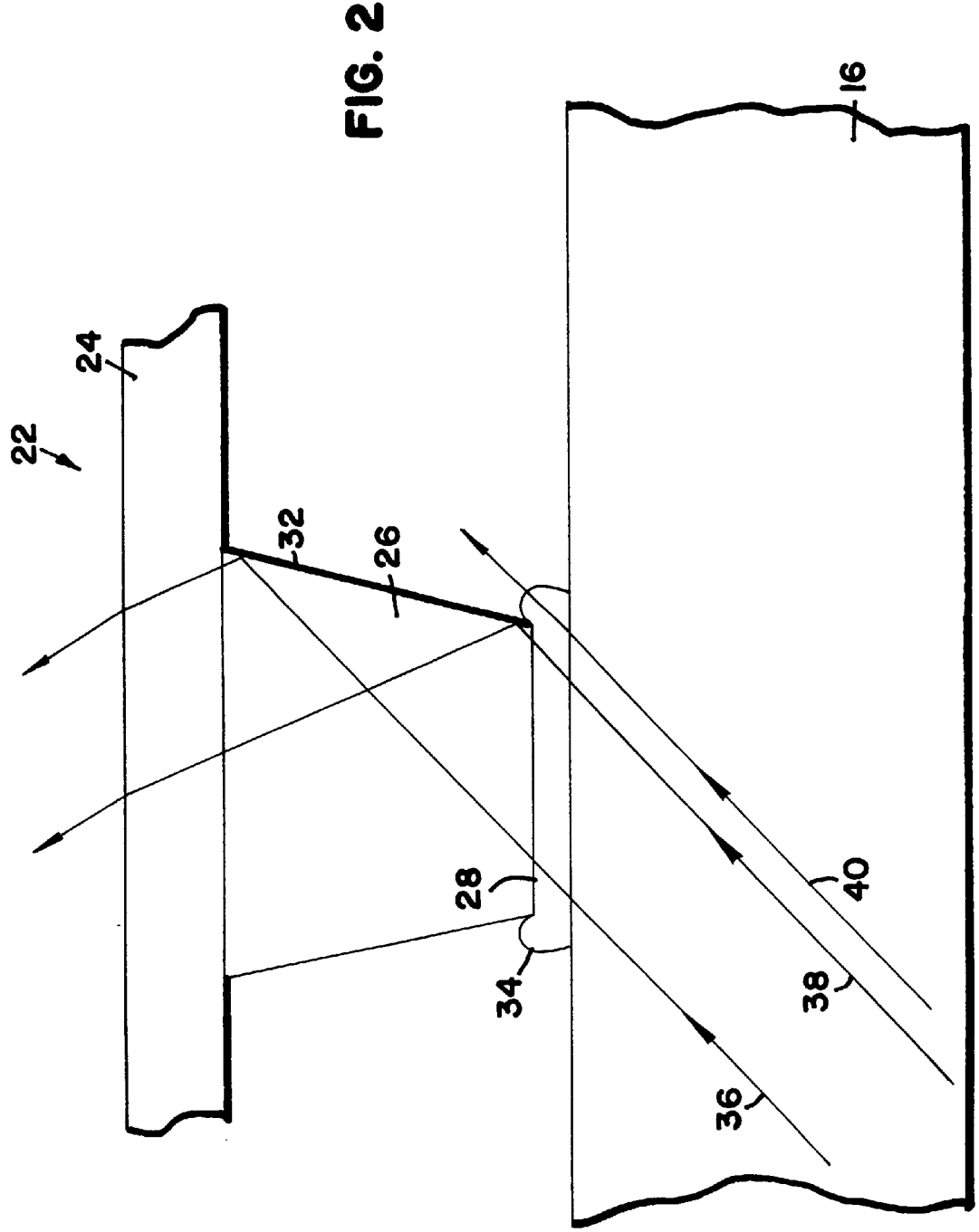
FIG. 2 is a cross-section of a waveguide illustrating extraction of light therefrom using a second embodiment of the present invention.

FIG. 2 illustrates a second embodiment of the present invention, in which a composite FET 22 is formed by securing a light coupling element 26 directly to the lower surface of the outer portion 24. A thin layer of index matching agent 34, intermediate the input face 28 and the core 16, may be used to provide high quality optical coupling therebetween. The index matching agent 34 may be an optically transparent adhesive, such as an optical epoxy, which advantageously secures the FET 22 to the fiber 14.

Light ray 36 passes from the core 16, passes through the layer of the index matching agent 34, reflects off a point near the top of reflecting surface 32, and exits through the outer portion 24. Light ray 38 is directed out of the core 16 by the FET 22 in a similar manner, but reflects off the lower portion of the reflecting surface 32. Light ray 40 passes into the index matching agent 34, but misses the light coupling element 26, and escapes. It is preferred to maintain the index matching agent 34 as thin as possible, or for the index matching agent 34 to preserve the shape of the input face 28, and thus reduce the amount of light lost in the manner of light ray 40. The refractive index of the index matching agent 34 may lie between the refractive index of the core 16 and the refractive index of the light coupling element 26 so as to reduce reflective losses. The refractive index of the index matching agent 34 may alternatively be higher than the refractive index of the core 16 in order to refract light away from the surface of the core 16, and thus reduce losses of the type shown for light ray 40.

An alternative to using an adhesive index matching layer 34 is to coat the input surface 28 of the light coupling element with a monomer of the material used in the core 16. For example, if the core 16 is formed of an acrylate material, then an acrylate monomer may be applied to the input surface 28. Once the light coupling element 26 is placed in contact with the core 16, the monomer may then be cured, for example by illumination with ultraviolet (UV) light, so as to form a secure optical contact therebetween.

An advantage of the second embodiment over prior art light extractors is that the FET 22 of the second embodiment allows the light coupling elements 26 and the outer portion 24 to be formed from different materials, while including at most only one layer of index matching agent 34. In contrast, prior art extractors formed with components of different materials include two layers of adhesive. The first adhesive layer in the prior art extractor is between the light coupling prisms and the waveguide core, and the second adhesive layer is between the light coupling elements and the outer portion.

Figure 8:
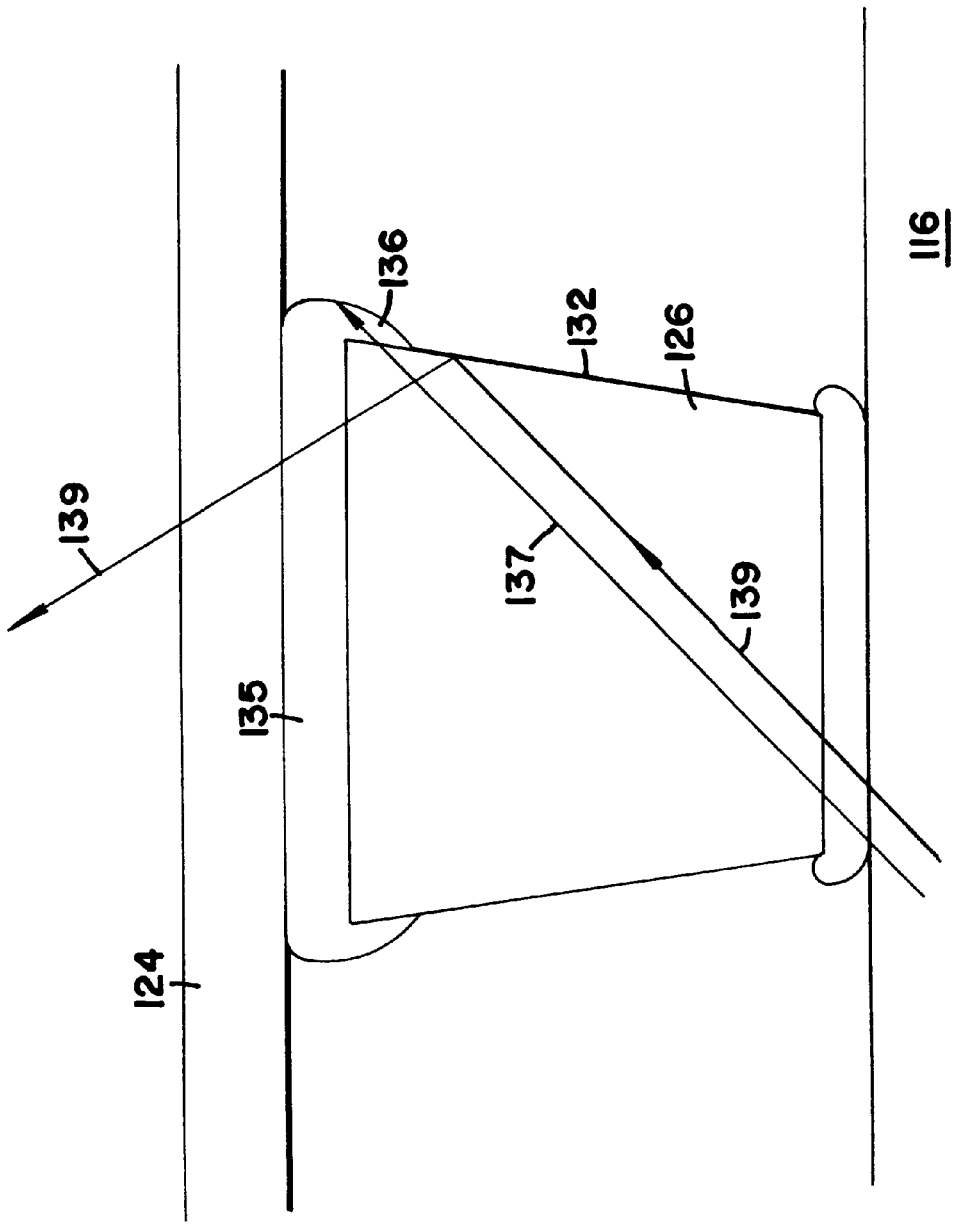
FIG. 8 illustrates a prior art light extractor.

Another advantage of the present invention over the prior art light extractors is that the manufacturing process is simpler, since the present invention omits at least one of the adhesive layers required by the prior art. Moreover, the omission of at least one of the adhesive layers reduces the possibility of adhesive migration on the reflecting surface 32, which compromises the reflective qualities when the reflecting surface operates by total internal reflection. FIG. 8 illustrates this problem, where a prior art light extractor including a prism 126 attached to a waveguide 116 by an adhesive layer 134. A second adhesive layer 135 attaches the prism 126 to a substrate 124. A portion of adhesive 136 has migrated on the reflective surface 132 of a prior art device. Light 137 incident at the area where the adhesive 136 is on the reflecting surface 132 is transmitted out of the light coupling element 126, unlike light ray 139 which reflects off the reflecting surface 132 in the desired direction. Furthermore, the prior art devices have higher optical losses due to the higher number of material interfaces and increased scattering and absorption.

Figure 3:
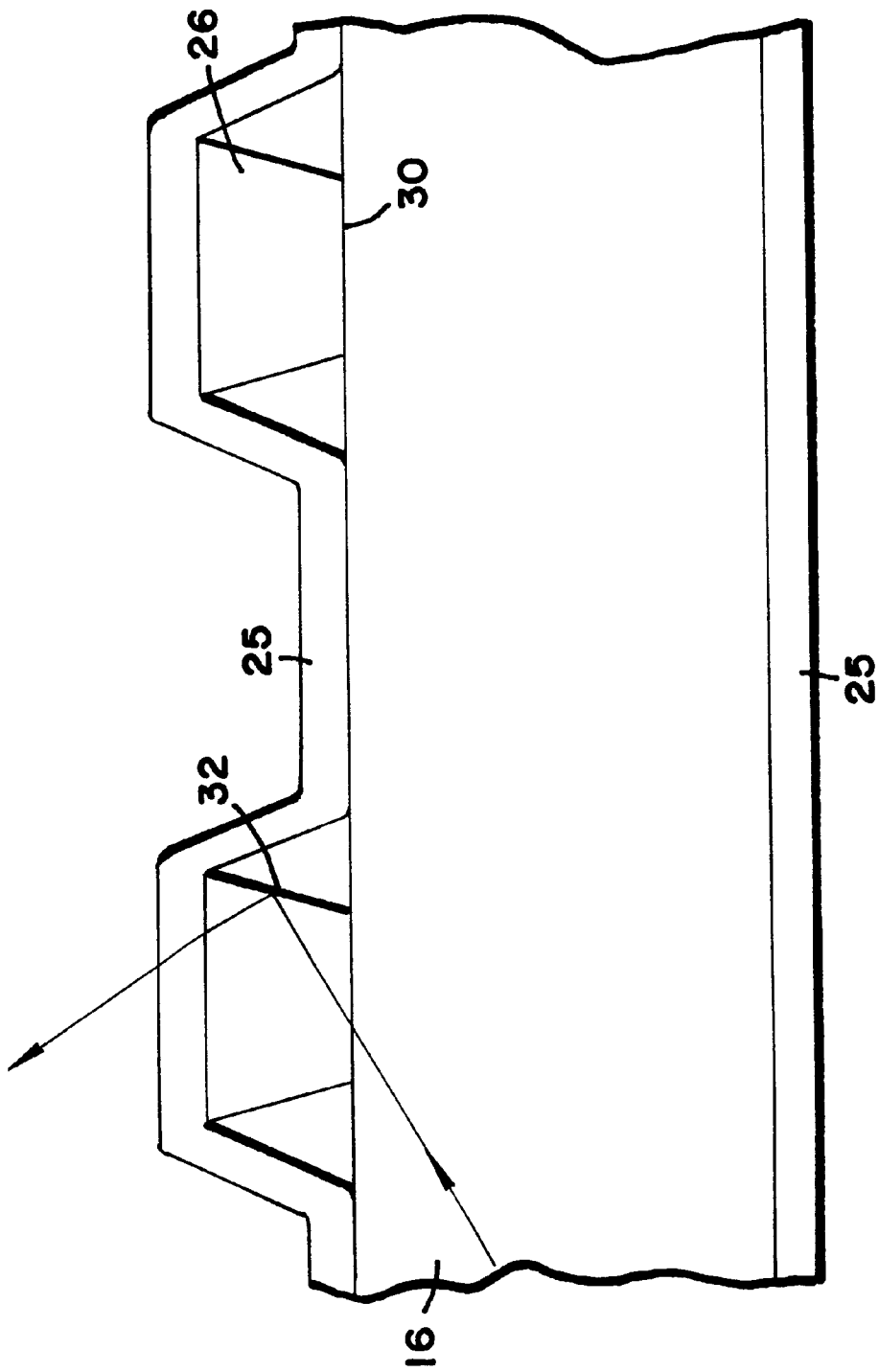
FIG. 3 is a cross-section of a waveguide illustrating extraction of light therefrom using a third embodiment of the present invention.

FIG. 3 illustrates a third embodiment of the invention where the refractive index of the outer portion 25 is lower than the refractive index of the core 16. Consequently, the outer portion 25 may also be used as a cladding. To fabricate the FET 22 of FIG. 3, the light coupling elements 26 are preferably applied to the core 16 first, and then the outer portion 25 applied as a heat-shrinkable cladding so as to shrink around the core 16 and light coupling elements 26. The resulting outer portion 25 may contact the core 16 in portions intermediate the light coupling elements 26 to form a conventional cladding layer at these intermediate portions. The light coupling elements 26 may be applied to the core 16 using an adhesive layer of index matching agent 34, or using other methods as described herein. It is understood that alternative procedures for forming the fiber/FET structure of FIG. 3 may be used. For example, the light coupling elements 26 may be integral with the outer portion 25 as a heat-shrinkable unit.

Figure 4B:
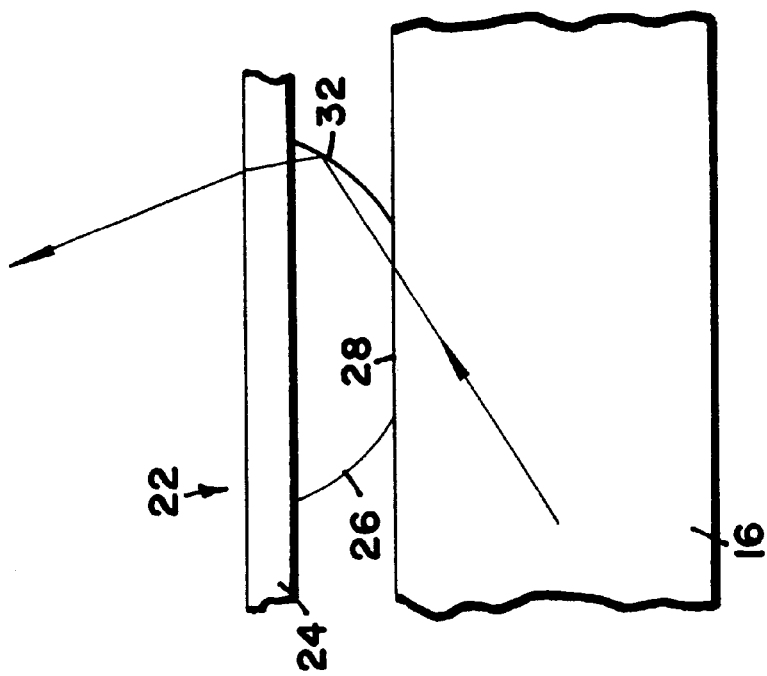
FIG. 4B illustrates the light coupling element of FIG. 4A under compression.
Figure 4A:
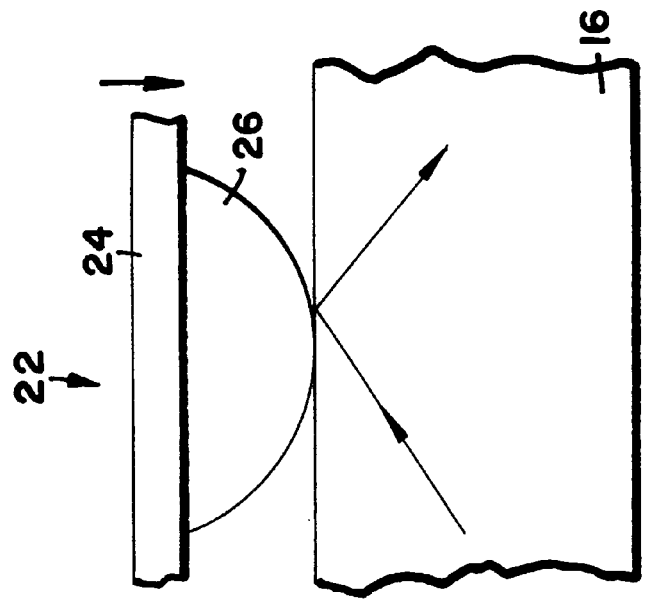
FIG. 4A illustrates a light coupling element having a spherical cross-section.

Another important aspect of the present invention is illustrated in FIGS. 4A and 4B, which show the effect of manufacturing the light coupling element 26 from a material which is elastic, or compressible. The light coupling element 26 has a convex shape, for example a portion of a sphere. If pressure is applied to the outer portion 24 in the direction shown by the arrow, the light coupling element 26 is pushed against the core 16 so as to increase the area of the input face 28 in contact with the core 16. Adjustment of the pressure on the FET 22 results in changing the area of the input face, 28, thus altering the fraction of light extracted from the core. The FET 22 may, therefore, be operable as a continuously variable pressure sensitive switch.

The light coupling element 26 may be designed to produce different pressure-dependent characteristics having a portion of the input face which lies at a slope relative to the surface of the core 16. In illustration, the spherical light coupling element 26 illustrated in FIGS. 4A and 4B may be manufactured from a relatively compressible material, thus allowing a large, continuous variation in the area of the input face 28. The variation in input face area is reduced for material having a lower compressibility. Other shapes may be employed for the light coupling element. For example, FIG. 4C illustrates a light coupling element 26 essentially trapezoidal in shape with a convex portion on the input face 28. Increasing the pressure applied to this light coupling element 26 results in a continuous increase in the input face area until the whole input face is pressed against the core 16. Further increases in the pressure do not result in any significant change in the area of the input face 30. Another alternative shape for the light coupling element 26 is illustrated in FIG. 4D, where the shape is essentially trapezoidal, but where the input face 28 lies at a small angle relative to the core 16. Other pressure-dependent characteristics may be selected by a judicious choice of the material properties and the shape of the light coupling element 26.

A periodic array of pressure sensitive light coupling elements may be designed to have minimal contact area in the absence of pressure and a large contact area when pressure is exerted. If the light coupling elements 26 are made of a suitably deformable material, or a suitable transparent adhesive is applied between the input faces 28 and the core 16, then the contacting area of the pressure sensitive light coupling elements 26 may be adjusted and set permanently. Such a one-time adjustment is advantageous for field installations and certain security applications.

Figure 5B:
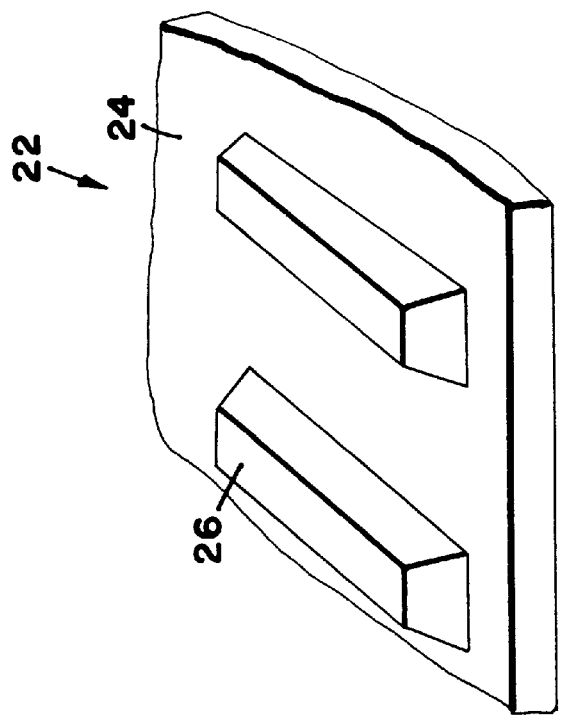
FIG. 5B illustrates a second geometry for the light extraction tape according to the present invention.
Figure 5A:
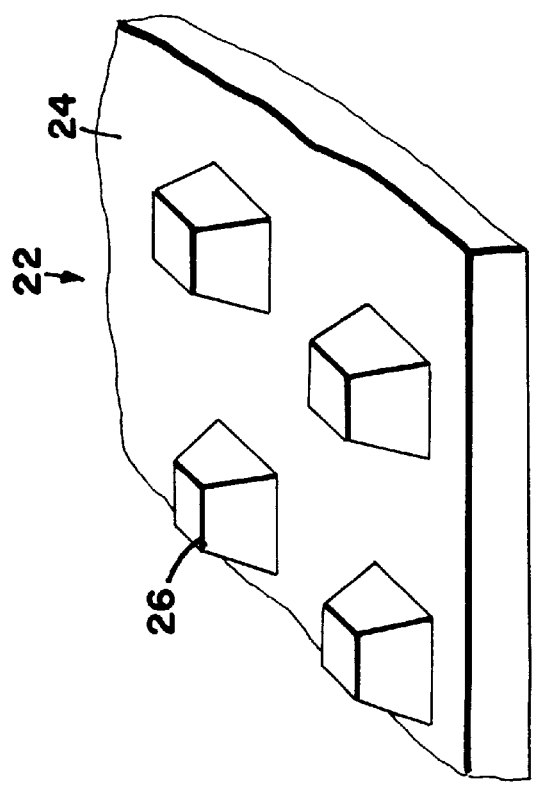
FIG. 5A illustrates a first geometry for the light extraction tape according to the present invention.

FIGS. 5A and 5B illustrate alternative arrangements for implementing the invention. FIG. 5A illustrates an FET 22 where the light coupling elements 26 are implemented in an array of individual trapezoidal prisms. Such an implementation is advantageous where the application requirements are for low extraction rate with high light coupling element density, as would be the case, for example, where the light output from the fiber 14 is required to be uniform, but over a relatively long length of fiber. FIG. 5B illustrates an FET 22 where the light coupling elements 26 are implemented as ribs having a trapezoidal cross-section. Such an implementation is advantageous where the application requires a high extraction rate.

FIG. 6 illustrates a preferred method of manufacturing the first embodiment of the FET 22. FIG. 6A shows a positive mold 50 having a predetermined geometric structure corresponding to the FET 22. A detachable resin is brought into contact with the positive mold 50 and cured at normal temperature and detached to form a negative mold 52. Examples of the detachable resin include templating silicone SE9555 manufactured by Toray Dow Corning Co., Ltd.

A preliminary component comprising a monomer component containing isooctyl acrylate, acrylic acid and a photoinitiator component in predetermined proportions is charged in a stirring device, and is subjected to ultraviolet polymerization with stirring. At this stage, a partial polymerization is carried out so that the viscosity ranges from 100 to 100,000 cps to prepare a partially polymerized syrup. A predetermined amount of a crosslinking agent monomer, 1,6-hexanediol diacrylate, and additional photoinitiator are added to the syrup, and the resultant is mixed uniformly to prepare a precursor composition of the FET 22. The interior of the stirring device is generally purged with a non-reacting gas such as nitrogen gas, etc. at the time of photopolymerization. Such a polymerization reaction generally does not include heating. An example of the syrup includes a mixture of 90 parts of isooctyl acrylate, 10 parts of acrylic acid and 0.1 part of photoinitiator. 1 part of 1,6-hexanediol diacrylate and 0.2 parts of additional photoinitiator are added to the syrup after partial polymerization.

The next stage, illustrated in FIG. 6B, includes bringing the precursor composition 54 into contact with the negative mold 52, and the composition is covered with a transparent film 56. The precursor composition 54 is cured by UV cross-linking. UV light transmitted by the film 56 illuminates the precursor composition 54 to complete curing and, after the negative mold 52 and film 56 have been removed, a sheet of compressible FET 22 is obtained. A UV fluence ranging from 100 mJ cm$^{-2}$ to 1,000 mJ cm$^{-2}$, and having a wavelength ranging from 300 nm to 400 nm is preferably used for curing.

The transparent film 56 is used for barring oxygen and making the upper surface of the outer portion 57 flat. The film 56 may also be used as a transparent substrate fixed to the outer portion 24. A flexible plastic, such as polyester may be used for the film 56.

The thickness of the outer portion 58 may be controlled by pouring an excess of the precursor composition 54 into the negative mold 52 and the film 56 laminated on top. The mold 52, precursor 54 and film 56 are passed through a knife coater together, where the gap of the knife coater is set at a predetermined distance. Excess precursor composition is squeezed out at the sides, so that the thickness of the outer portion 58 is adjusted to the desired value.

Alternatively, the positive mold 50 may be formed from a sanded glass plate, or a re-usable negative mold may be formed from, for example a metal coated with a releasing agent. The releasing agent may be a fluorinated resin, such as polytetrafluoroethylene.

The FET 22 shown in FIG. 2 has a composite structure, where the light coupling elements 26 are secured to a substrate acting as an outer portion 24. The outer portion 24 is typically formed from a polyurethane film. The light coupling elements 26 may be formed from transparent, curable materials, including acrylates, which are cured by exposure to ultraviolet light 68, or urethane or silicone adhesives, which are cured under heat.

Figure 7:
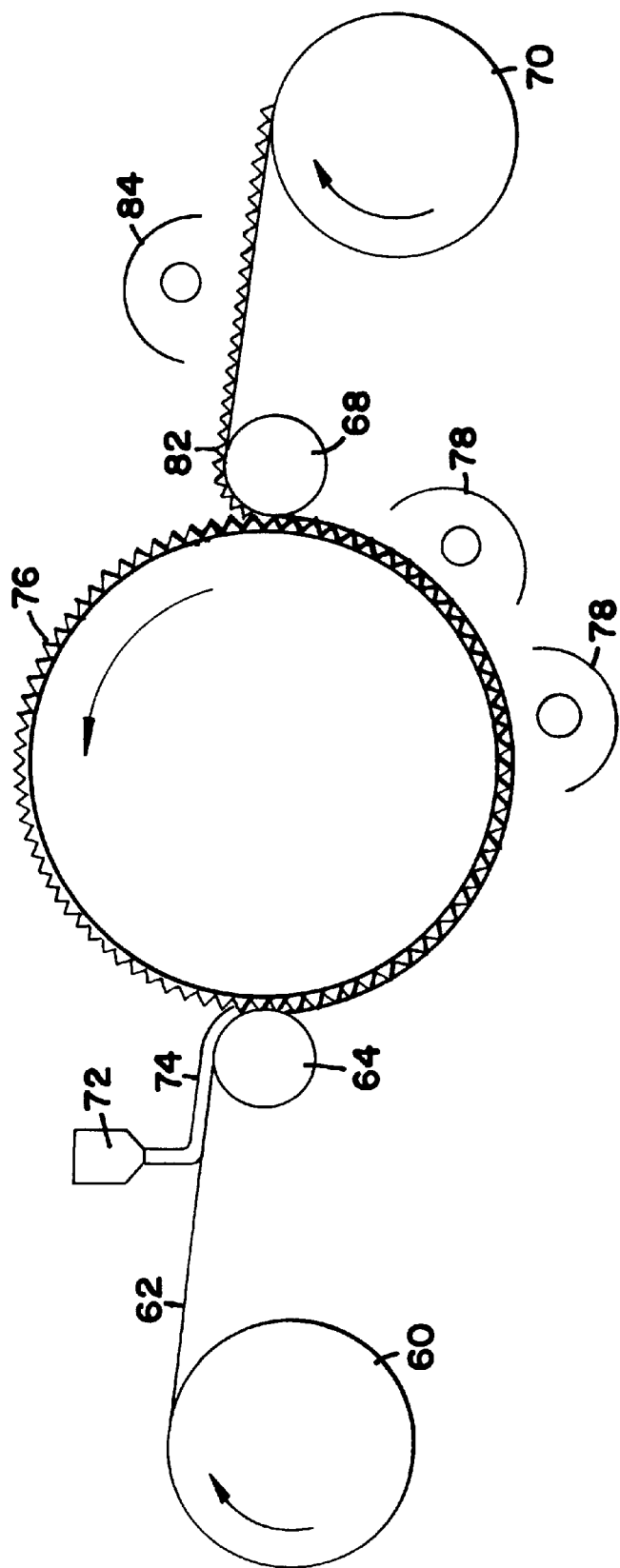
FIG. 7 illustrates a process for forming a composite light extraction tape.

FIG. 7 illustrates a method of manufacturing the second embodiment of the FET 22 using a UV curable acrylate. A first drum 60 dispenses a substrate sheet 62, typically polyurethane, to a first pinch drum 64, where the sheet 62 is pinched between the first pinch roller 64 and a molding drum 66. A second pinch roller 68 is located at approximately 180° around the molding drum 66 from the first pinch roller 64, where the sheet 62 is peeled off the molding drum 66. The first and second pinch rollers 64 and 68 hold the sheet 62 therebetween in close contact with the molding drum 66. A second drum 70 receives the sheet 62 after it has been peeled off the molding drum 66. A dispenser 72 dispenses a flowable, transparent, UV curable resin 74 so as to flow between the sheet 62 and the molding drum 66. The sheet 62 between the first and second pinch rollers 64 and 68 molds the resin by holding it against a molding surface 76 on the molding drum 66. The molding surface 76 is shaped to mold the light coupling elements 26. A first UV light source 78 illuminates the resin 74 as it passes between the first and second pinch rollers 64 and 68, so as to achieve at least partial curing of the resin 74. The resin 74 adheres to the sheet 62 to form a composite FET 82 which is peeled off the molding drum 66 at the second pinch roller 68. A second UV light source 84 may be used for further curing.

For an FET 22 formed as a composite structure, the FET 22 may be removed from fabrication before the material of the light coupling elements 26 is completely cured and retains a degree of flowability. The FET 22 may be applied to the core 16 so as to form optical interfaces 30 between the light coupling elements 26 and the core 16, and then the curing process completed in place.

In summary, a front extraction tape has been described which enables a user to extract light transversely from a waveguide. The front extraction tape is simpler to manufacture and incurs less reflective loss than prior art waveguide output extractors. Additionally, it may be implemented using a compressible material, thus permitting the tape to produce a pressure-sensitive output.

The foregoing description of the illustrated embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A front light extraction tape for use with a light guiding device having an output surface, comprising:
    a light transmissive outer portion; and
    a discretely formed light coupling element adhesivelessly contacted to a lower surface of the outer portion for movement therewith, an input surface of the light coupling element contactable with the output surface of the light guiding device for receiving light therefrom and a specularly reflecting surface of the light coupling element aligned so as to internally reflect light received into the light coupling element out through the light transmissive outer portion.

2. The front light extraction tape of claim 1, wherein the input surface of the light coupling element is deformable so as to form optical contact directly on the light guiding device.

3. The front light extraction tape of claim 2, wherein the input surface of the light coupling element comprises a portion sloped relative to the output surface and has an area contactable on the output surface, the area variable in response to pressure applied to the front light extraction tape.

4. The front light extraction tape of claim 3, wherein the area contactable on the output surface is settable at a determined value.

5. The front extraction tape of claim 1, wherein the light coupling element has a refractive index higher than or equal to a refractive index of the light guiding device.

6. The front extraction tape of claim 1, wherein the light coupling element has a refractive index lower than a refractive index of the light guiding device, and higher than a refractive index of a cladding layer on the light guiding device.

7. The front light extraction tape of claim 1, wherein the outer portion has a refractive index less than a refractive index of the light guiding device, and the outer portion is contactable on the light guiding device at areas proximate the light coupling element.

8. The front light extraction tape of claim 1, wherein the reflecting surface is aligned for total internal reflection of the light received into the light coupling element.

9. A front light extraction tape for use with a light guiding device having an output surface, comprising:

a light transmissive outer portion; and a light coupling element integrally formed on a lower surface of the outer portion as a unitary structure for movement therewith, an input surface of the light coupling element deformable so as to form optical contact directly on the light guiding device for receiving light therefrom and a specularly reflecting surface of the light coupling element aligned so as to internally reflect light received into the light coupling element out through the light transmissive outer portion.

10. The front light extraction tape of claim 9, wherein the input surface of the light coupling element comprises a portion sloped relative to the output surface and has an area contactable on the output surface, the area variable in response to pressure applied to the front light extraction tape.

11. The front light extraction tape of claim 10, wherein the area contactable on the output surface is settable at a determined value.

12. The front extraction tape of claim 9, wherein the light coupling element has a refractive index higher than or equal to a refractive index of the light guiding device.

13. The front extraction tape of claim 9, wherein the light coupling element has a refractive index lower than a refractive index of the light guiding device, and higher than a refractive index of a cladding layer.

14. The front light extraction tape of claim 9, wherein the reflecting surface is aligned for total internal reflection of the light received into the light coupling element.

15. A transverse-output optical fiber device, comprising:

a waveguiding core having an output region on a surface; and a front light extractor secured on the output region, the extractor comprising a light transmissive outer portion and a discretely formed light coupling element adhesivelessly contacted to a lower surface of the outer portion for movement therewith, an input surface of the light coupling element contacted to a coupling portion of the output region for receiving light therefrom and a specularly reflecting surface of the light coupling element aligned so as to internally reflect light received into the light coupling element out through the light transmissive outer portion.

16. The device of claim 15, wherein the input surface of the light coupling element is deformable so as to form optical contact directly on the light guiding device.

17. The device of claim 16, wherein the input surface of the light coupling element comprises a portion sloped relative to the surface of the waveguiding core and has an area contactable on the output region, the area variable in response to pressure applied to the front light extractor.

18. The device of claim 15, wherein the area contactable on the output region is settable at a determined value.

19. The device of claim 15, wherein the light coupling element has a refractive index higher than or equal to a refractive index of the waveguiding core.

20. The device of claim 15, further comprising a cladding layer covering at least a portion of the waveguiding core, wherein the light coupling element has a refractive index lower than a refractive index of the waveguiding core, and higher than a refractive index of the cladding layer.

21. The device of claim 15, wherein the outer portion has a refractive index less than a refractive index of the waveguiding core, and the outer portion is contactable on the waveguiding core at areas proximate the light coupling element.

22. The device of claim 15, wherein the front light extractor includes a plurality of light coupling elements disposed along the light transmissive outer portion, the spacing between light coupling elements and areas of the input surfaces of the light coupling elements selected so as to extract light from the waveguiding core essentially uniformly along a length of the output region.

23. The device of claim 15, wherein the reflecting surface is aligned for total internal reflection of the light received into the light coupling element.

24. A transverse-output optical fiber device, comprising:

a waveguiding core having an output region on a surface; and a front light extractor secured on the output region, the extractor comprising a light transmissive outer portion and a light coupling element integrally formed on a lower surface of the outer portion as a unitary structure for movement therewith, an input surface of the light coupling element deformable so as to form optical contact directly on the waveguiding core for receiving light therefrom and a specularly reflecting surface of the light coupling element aligned so as to internally reflect light received into the light coupling element out through the light transmissive outer portion.

25. The device of claim 24, wherein the input surface of the light coupling element comprises a portion sloped relative to the surface of the waveguiding core and has an area contactable on the output region, the area variable in response to pressure applied to the front light extraction tape.

26. The device of claim 25, wherein the area contactable on the output region is settable at a determined value.

27. The device of claim 24, further comprising a cladding layer covering at least a portion of the waveguiding core, wherein the light coupling element has a refractive index lower than a refractive index of the light guiding device, and higher than a refractive index of the cladding layer.

28. The device of claim 24, wherein the light coupling element has a refractive index higher than or equal to a refractive index of the waveguiding core.

29. The device of claim 24, wherein the front light extractor includes a plurality of light coupling elements disposed along the light transmissive outer portion, the spacing between light coupling elements and areas of the input surfaces of the light coupling elements selected so as to extract light from the waveguiding core essentially uniformly along a length of the output region.

30. The device of claim 24, wherein the reflecting surface is aligned for total internal reflection of the light received into the light coupling element.

* * * * *

UNITED STATES PATENT AND TRADEMARK OFFICE
CERTIFICATE OF CORRECTION

PATENT NO. : 5,995,690

DATED : NOVEMBER 30, 1999

INVENTOR(S) : KOTZ ET AL.

It is certified that error appears in the above-identified patent and that said Letters Patent is hereby corrected as shown below:

Col. 3, line 27: "$\theta_{c=sin}^{-1}$" should read --$\theta_c = \sin^{-1}$--

Signed and Sealed this

Twenty-second Day of May, 2001

*Attest:*

NICHOLAS P. GODICI

*Attesting Officer*     *Acting Director of the United States Patent and Trademark Office*